United States Patent Office 3,540,044
Patented Nov. 10, 1970

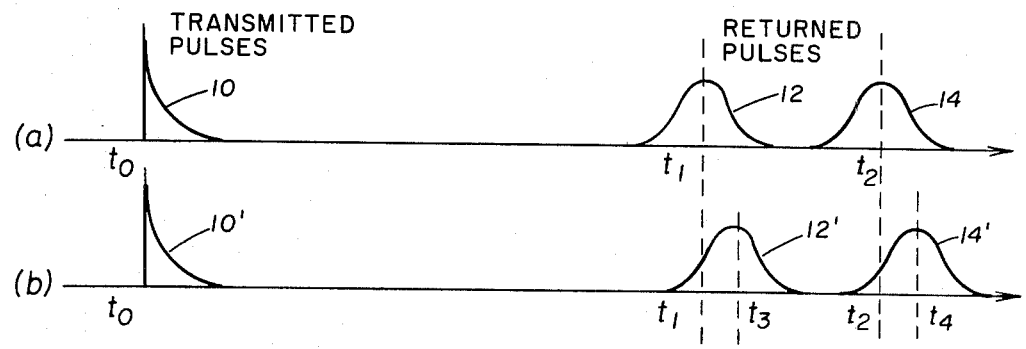
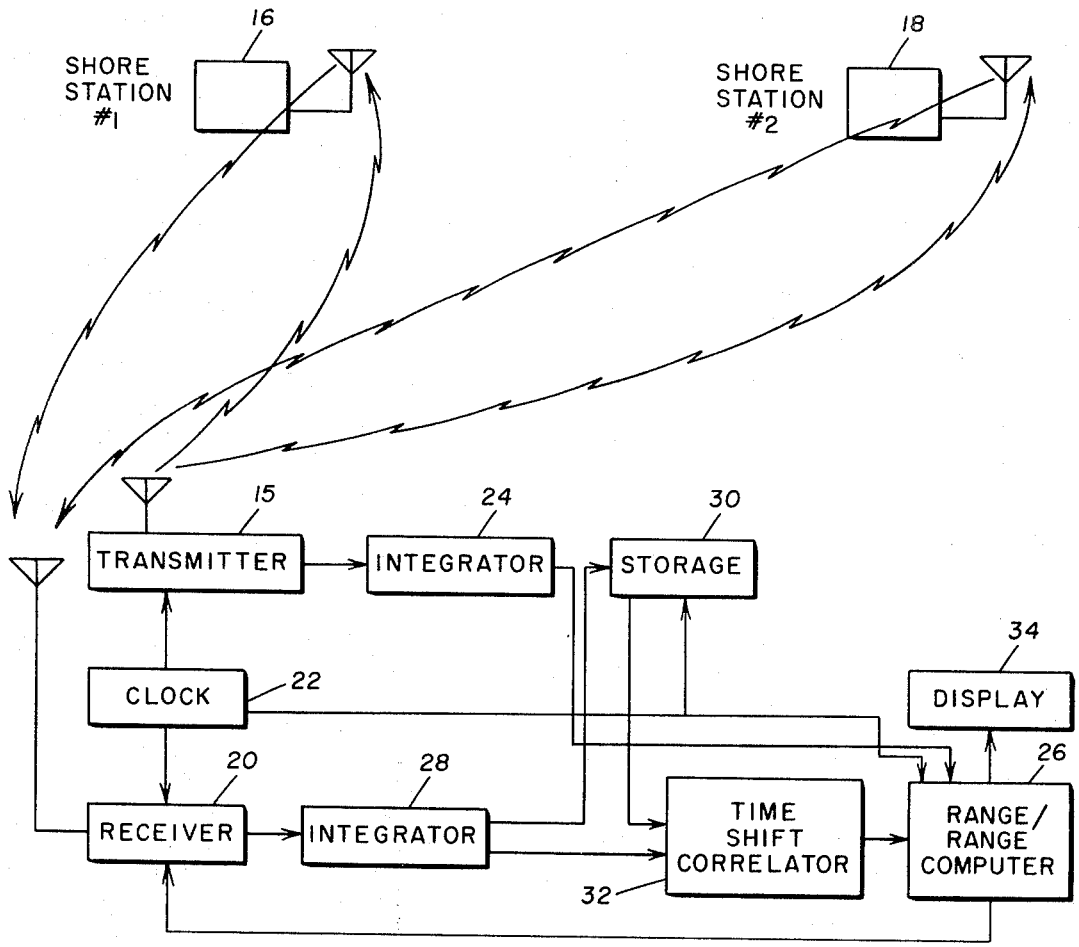

3,540,044
REDUNDANCY ELIMINATING RADIO NAVIGATION METHOD AND SYSTEM
Kenneth E. Burg, Dallas, Tex., assignor to Texas Instruments Incorporated, Dallas, Tex., a corporation of Delaware
Filed June 18, 1968, Ser. No. 738,059
Int. Cl. G01s 9/06, 9/56
U.S. Cl. 343—6.5                               8 Claims

ABSTRACT OF THE DISCLOSURE

Pulse signals are periodically transmitted from a moving station to a pair of fixed position transponders. The transponders respond with pulses which are transmitted back to the moving station. In the initial operation of the system, the time intervals between the transmitted pulse signals and the received pulses are measured at the moving station to provide a range/range indication of the position of the moving station. After this initial accurate measurement has been made, only the time correlation between successive received pulses from each transponder is measured to provide range/range information of the change of position of the moving station from the initial accurate measurement.

---

This invention relates to a position determining method and system, and more particularly to an improved range/range position determining method and system for use with seismic exploration vessels.

A large amount of seismic exploration is presently conducted in areas several hundred miles from the shore. It is extremely important to provide accurate positional information for such seismic exploration vessels in order that the seismic data obtained by the vessels can be accurately correlated with the location of area being surveyed. Additionally, it is increasingly important to be able to maintain the positions of such seismic exploration vessels secure from the attention of foreign vessels.

Numerous systems have been heretofore developed in attempts to satisfy the accuracy required for use with seismic exploration vessels. For example, U.S. Pats. 3,181,146 and 3,181,155, issued Apr. 27, 1965, are exemplary of a type of system often termed a range/range position determining system, wherein the round trip travel time of pulses transmitted from a seismic exploration vessel to a pair of fixed shore stations and back to the seismic exploration vessel is determined to designate the position of the vessel. The systems disclosed in the above-noted patents utilize passive radar targets at the shore stations. Other systems utilizing the range/range position determining technique have utilized transponders located at the shore station which transmit coded pulses back to the seismic exploration vessel when interrogated by pulses transmitted from the vessel.

Such previously developed range/range systems have generally computed the range between a shore station and the seismic exploration vessel by determining the time interval between each pulse transmitted from the vessel and each corresponding pulse received by the vessel. Generally, due to the frequencies at which successive range/range measurements are made by such systems, the time intervals determined by successive range measurements have not generally differed by substantial amounts, as the vessel has not traveled a substantial distance between the successive range measurements. Successive range/range measurements by previously developed systems have thus contained considerable amounts of redundancy. The present invention substantially reduces these redundant measurements.

Additionally, seismic work in previous years was generally done near shore so that conventional electronic surveying techniques could be used to locate the survey. However, at the greater distances from shore now required, the strength of signal measurements of such conventional systems has decreased in significant amounts, whereas atmospheric and other radio frequency noise has tended to remain constant. The signal-to-noise ratio of conventional systems has thus deteriorated to the point that their radio range pulses are no longer diagnostic.

One technique for improving the signal-to-noise ratio in range/range systems is to repeat the transmitted pulses a large number of times and then to integrate the time of arrival of received pulses. These repeating and integrating functions are performed 1000 times or more for each range/range cycle. Achieving this improvement in signal-to-noise ratio consumes considerable time, and limits the frequency with which the periodic range measurement can be made. In the system of this invention herein disclosed, the need for a large number of repeated pulses is eliminated and thus range measurements can be made more frequently.

As previously mentioned, many navigation systems of the range/range type heretofore developed have required the measurement of the time interval between transmitted and received pulses. This measurement requires precise determination of the instant of first arrival of the received pulses. However, due to propagation and instrumentation losses, the received pulses are generally stretched out in time, thereby requiring a very high signal-to-noise ratio for the determination of the instant of arrival. The present invention utilizes a pulse matching process, thus requiring a lower signal-to-noise ratio than such prior systems.

In accordance with the present invention, the relative accuracy of successive range measurements required in the collection of seismic exploration and oceanographic data is improved by determining only the difference in range travel time between successive range measurements from each transponder. In operation of the invention, interrogating pulse signals are periodically transmitted from a moving station to at least two fixed position stations, which in turn transmit responding pulse signals back to the moving station. Indications of the transmission and the arrival of pulse signals are stored aboard the moving station. The time correlation between successive arriving interrogated pulse signals is determined and utilized to provide range/range indications of the change of position of the moving station.

For a more complete understanding of the present invention and for further objects and advantages thereof, reference is now made to the following description taken in conjunction with the acompanying drawings, in which:

FIG. 1 is a diagrammatic illustration of waveforms involved in two successive range/range computations according to the present invention; and FIG. 2 is a block diagram of an embodiment of the invention.

In essence, the present invention operates according to the theory that very accurate range measurements may be obtained by determining the relatively short time interval between successive return pulses, rather than the relatively long time interval between transmitted pulses and return pulses in the same range/range cycle. Referring to FIG. 1a, at time $t_0$ the pulse designated generally as 10 is transmitted from the seismic exploration vessel. Pulse 10 is received by two spaced apart shore stations each having a transponder. At time $t_1$, a responding pulse 12 is received by the vessel from one of the shore stations. At time $t_2$, a responding pulse 14 is received from the second shore station. As may be seen by an inspection of the pulses 10, 12 and 14, the pulses 12 and 14 have lost their sharp leading edges due to propagation and instrumentation losses. Problems thus arise in accurately determining the time intervals $t_0-t_1$, and $t_0-t_2$ in order to determine the ranges between the seismic exploration vessel and the shore stations. In previously developed systems, a large number of repetitive pulse measurements have generally been required in order to make accurate determinations of the time intervals $t_0-t_1$, and $t_0-t_2$.

FIG. 1b illustrates the transmitted pulse 10' for the next range/range measurement cycle of the system. Due to movement of the vessel between the successive range/range measurements, the received pulses 12' and 14' are now received at the vessel at times $t_3$ and $t_4$. In conventional systems, the time intervals between $t_0-t_3$ and $t_0-t_4$ would be determined, thereby requiring a large number of repetitive measurements to eliminate errors due to noise and the like. However, in the present system, only the relatively short time intervals $t_1-t_3$ and $t_2-t_4$ are determined.

In operation of the invention, a large number of repetitive measurements of the time intervals $t_0-t_1$ and $t_0-t_2$ are made to provide a very accurate initial range/range measurement. These accurately measured time intervals are then stored and only the relatively short time intervals between successive returned pulses are measured by the system. These relatively short time interval measurements may be made with many less pulse repetitions in order to provide the desired accuracy. In essence, the present invention thus makes a single very accurate range/range measurement which is designated as a reference position. After this initial measurement, the position of the vessel relative to that reference position is computed, thereby providing improved signal-to-noise ratios without substantially increasing computation repetitions. Further, the present system is much less sensitive to distortion than prior systems, as the received pulses are generally subject to similar distortion which tends to cancel. The present system also provides security in information transmission, as the meaningful pulses will be buried in noise to a foreign receiver.

FIG. 2 illustrates a system for the accomplishment of the present technique. The transmitter 15 transmits high frequency pulse signals to a pair of fixed position shore stations 16 and 18. The shore stations 16 and 18 are preferably transponders which receive coded pulse signals from transmitter 15 and in response generate coded pulse signals to a receiver 20 located aboard the seismic exploration vessel. However, the present system may be also used with the passive shore stations disclosed in the previously identified U.S. Pats. 3,181,146 and 3,181,155.

The transponder circuitry preferably contained in shore stations 16 and 18 is well known, and will thus not be described in detail. For a description of such circuitry, reference is made to Introduction to Radar Systems, by Merrill I. Skolnik, McGraw-Hill, 1962, pp. 594–601. As is conventional in range/range systems, a delay is provided in one of the shore stations 16 or 18 in order to eliminate simultaneous transmission of interrogated pulses from the shore stations. This time delay is taken into account in the range/range computer at the seismic exploration system in a conventional manner.

A clock 22 is the heart of the present system and generates a precise series of triggering impulses for the transmitter 15. Additionally, precise reference signals are provided from clock 22 to other portions of the system for synchronisation of the system with the time of generation of the pulse signals from the vessel. Clock 22 initiates each range cycle at a preselected frequency low enough to enable the reception of returned pulses from the maximum range of the system. The periodic initiation of range cycles by the clock 22 enables the system to match only returned pulses, as will be later described. The repeated pulse signals from transmitter 15 for each range cycle are fed into an integrator 24 for time averaging in order to provide an exact indication of the time of transmission. This averaged output signal is fed into a conventional range/range computer 26, which may for example comprise a small onboard digital computer. An output from the computer 26 is fed back to receiver 20 to gate the receiver for elimination of noise when no return pulses are due.

The received pulses from the shore stations 16 and 18 for each range cycle are fed through the receiver 20 to an averaging or integrator circuit 28 for time averaging in order to determine an exact indication of the time of arrival by eliminating errors due to noise and the like. The output from the integrator 28 is fed into a storage circuit 30 and also into one input of a time shift correlator circuit 32. Storage circuit 30 stores, or delays, the averaged received pulses for one range/range cycle. As will be later described, storage circuit 30, in conjunction with the periodic pulses from clock 22, serves as a memory of the last determined range measurement. The storage circuit 30 may comprise any conventional circuit for storing the received pulses for one range/range cycle. For instance, the storage circuit 30 may comprise a conventional delay circuit having a delay time of one range/range cycle. Alternatively, the storage circuit 30 may comprise a conventional magnetic memory circuit adapted to store data for one range/range cycle and then to read out the data to correlator 32.

The time shift correlator 32 is a conventional correlation circuit wherein a first input signal is multipled by a delayed replica of the second input signal, and then averaged as by passing through a low pass filter. By continuously varying the delay time of the second input signal, the output of the correlator provides an indication of the actual time interval between the two input signals. For more detailed explanation of various conventionl correlators, reference is made to Introduction to Radar Systems, by Merrill I. Skolnik, McGraw-Hill, 1962, pp. 418–423.

Due to the delay of the previous averaged received pulse for one range/range cycle, each output of the correlator 32 is representative of the time interval between the integrated returned pulses for two successive range cycles from one shore station. This time interval is representative of the distance the seismic exploration vessel has traveled from one shore station since the last determined reference position. This time interval output is fed into the range/range computer 26. The same operation is then followed with respect to pulses received from the second shore station. The computer 26 includes appropriate coordinate computing circuitry to provide an output representative of the position of the vessel in response to the range/range information provided from the two shore stations. The output from the computer 26 is then fed to a suitable display and recording circuit 34.

In the initial operation of the circuit shown in FIG. 2, a large number, such as 1000, of repetitions of the transmitted pulse are generated and time averaged by the integrator 24 and then applied to the range/range computer 26. The 1000 received pulses from each shore station are time averaged by the integrator and fed through the correlator 32 to the range/range computer 26, wherein the initial reference position of the seismic exploration vessel is determined. The time averaged pulses from each shore station are also fed to the storage 30 where they are stored for one range/range cycle.

Upon the next succeeding range/range cycle, however, a reduced number of pulse repetition cycles, for instance 100 repetition cycles, are transmitted from the transmitter 15 in order to provide usable accuracy. Averaging of the transmitted pulses by integrator 24 is not required in this stage of operation of the system, an integrator 24 may be gated off until it is desired to make another very accurate reference position measurement. The received 100 repetition pulses from each shore station are fed to the integrator 28 and the resulting time averaged signals are fed to the correlator 32. After exactly one range/range cycle storage time in storage 30, the previously determined averaged returned pulses from the first range/range cycle are also fed to the time shift correlator 32 from storage 30. The output from the correlator 32 is thus representative of the time difference between the time averaged pulses from successive range/range cycles and indicates the change of position of the vessel from the initially determined reference range. Referring to FIG. 1, the output of the correlator 32 is thus representative of $t_1-t_3$ and $t_2-t_4$. This position change is added to or subtracted from the initial reference position stored within the computer 26 and displayed on the display circuitry 34. This procedure is repeated for succeeding range/range measurements so that position changes from the last determined position are fed to the computer 26 in the manner previously described.

While for most applications sufficient accuracy is provided by the system by comparing pulses of successive range measurements of each shore station, in some instances it may be desirable to store only an initial received pulse from each shore station. Comparisons may then be made between subsequent received pulses and the initial received pulse from each shore station. For instance, referring to FIG. 1, the received pulses 12 and 14 would be permanently stored and read out once every range/range cycle for comparison with the latest time averaged received pulses. Additionally, it is within the scope of this invention to provide circuitry to enable the operator to choose reference pulses for storage and comparison according to the invention. Such choice is particularly advantageous in seismic exploration when it is desired to reference all further data to a particular position of interest.

Whereas a preferred embodiment of the present invention has been described, it is to be understood that various changes and modifications may be suggested to one skilled in the art, and it is intended to encompass these changes and modifications in the appended claims.

What is claimed is:
1. In a position determining system, the combination comprising:
 (a) means for periodically transmitting pulse signals from a moving station to at least two fixed position stations,
 (b) receiving means on said moving station for receiving return pulse signals from said fixed position stations,
 (c) storage means for storing indications of preselected return pulse signals for predetermined times,
 (d) means responsive to said receiving means and storage means for determining time intervals between newly arriving return pulse signals and stored indications of said preselected return pulse signals, and
 (e) means responsive to the periodic transmission of said pulse signals and said time intervals between return pulse signals for providing range/range indications of the position of said moving station.

2. The combination of claim 1 wherein said means for determining time intervals comprises a correlator.

3. The combination of claim 1 and further comprising clock means for accurately controlling the generation of said pulse signals.

4. The combination of claim 1 and further comprising means for time averaging a plurality of transmitted and return pulse signals at said moving station before determining said time intervals to provide accurate time indications.

5. The combination of claim 1 wherein said storage means stores said return pulse signals one range/range cycle.

6. The method of determining the change of position of a seismic exploration vessel from a reference position comprising:
 (a) transmitting pulse signals from said vessel to at least two transponder stations,
 (b) receiving responding pulse signals from said transponder stations,
 (c) generating signals representative of the time intervals between selected pairs of the received responding pulse signals, and
 (d) generating range/range signals indicative of the change of position of said vessel from said reference position in response to said signals representative of the time intervals.

7. The method of claim 6 and further comprising:
correlating successive pairs of the received responding pulse signals from each transponder station.

8. The method of claim 7 and further comprising:
storing the received responding pulse signals for one range/range cycle for correlation with the next received responding pulse signals.

References Cited

UNITED STATES PATENTS

| | | | |
|---|---|---|---|
| 3,175,214 | 3/1965 | Ramsey et al. | 343—13 |
| 3,397,400 | 8/1968 | Maass et al. | 343—112 |
| 3,469,229 | 9/1969 | Pure et al. | 343—6.5 |

RODNEY D. BENNETT, JR., Primary Examiner

M. F. HUBLER, Assistant Examiner

U.S. Cl. X.R.

343—13, 15, 112